Aug. 10, 1943.  J. E. RENHOLDT  2,326,678
CLUTCH
Filed Sept. 4, 1941  2 Sheets-Sheet 1
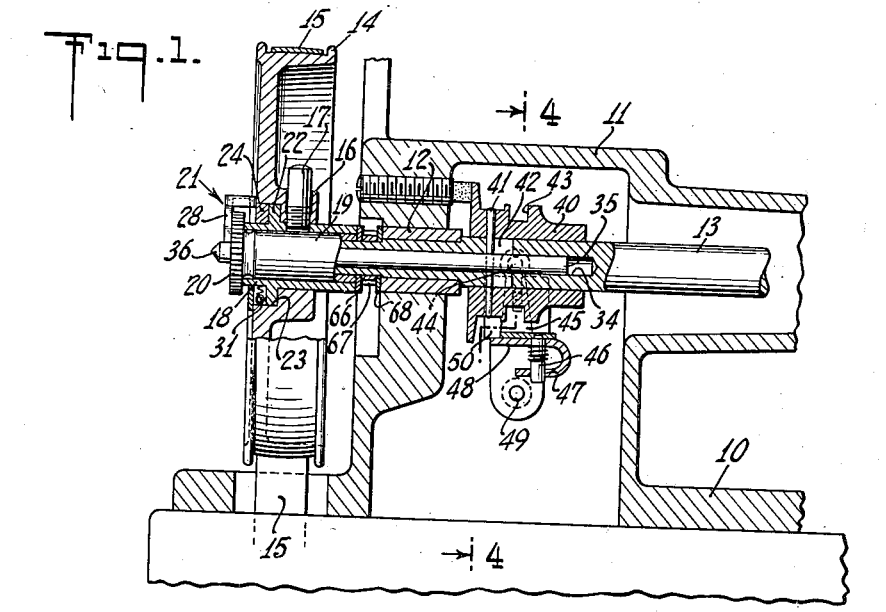
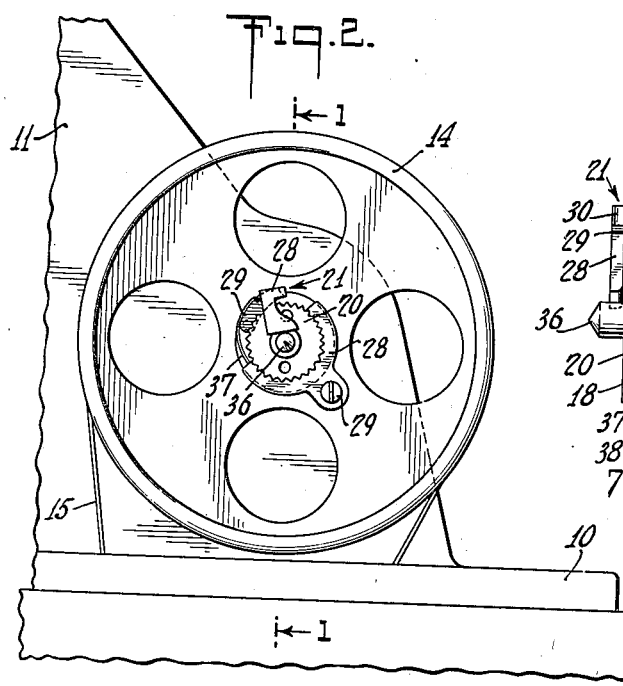
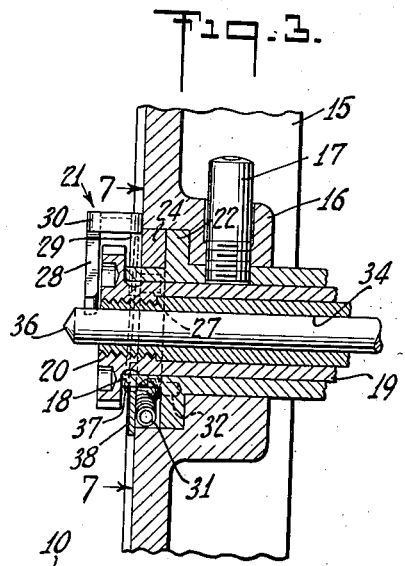
INVENTOR
John E. Renholdt
BY
Blair, Curtis & Hayward
ATTORNEYS

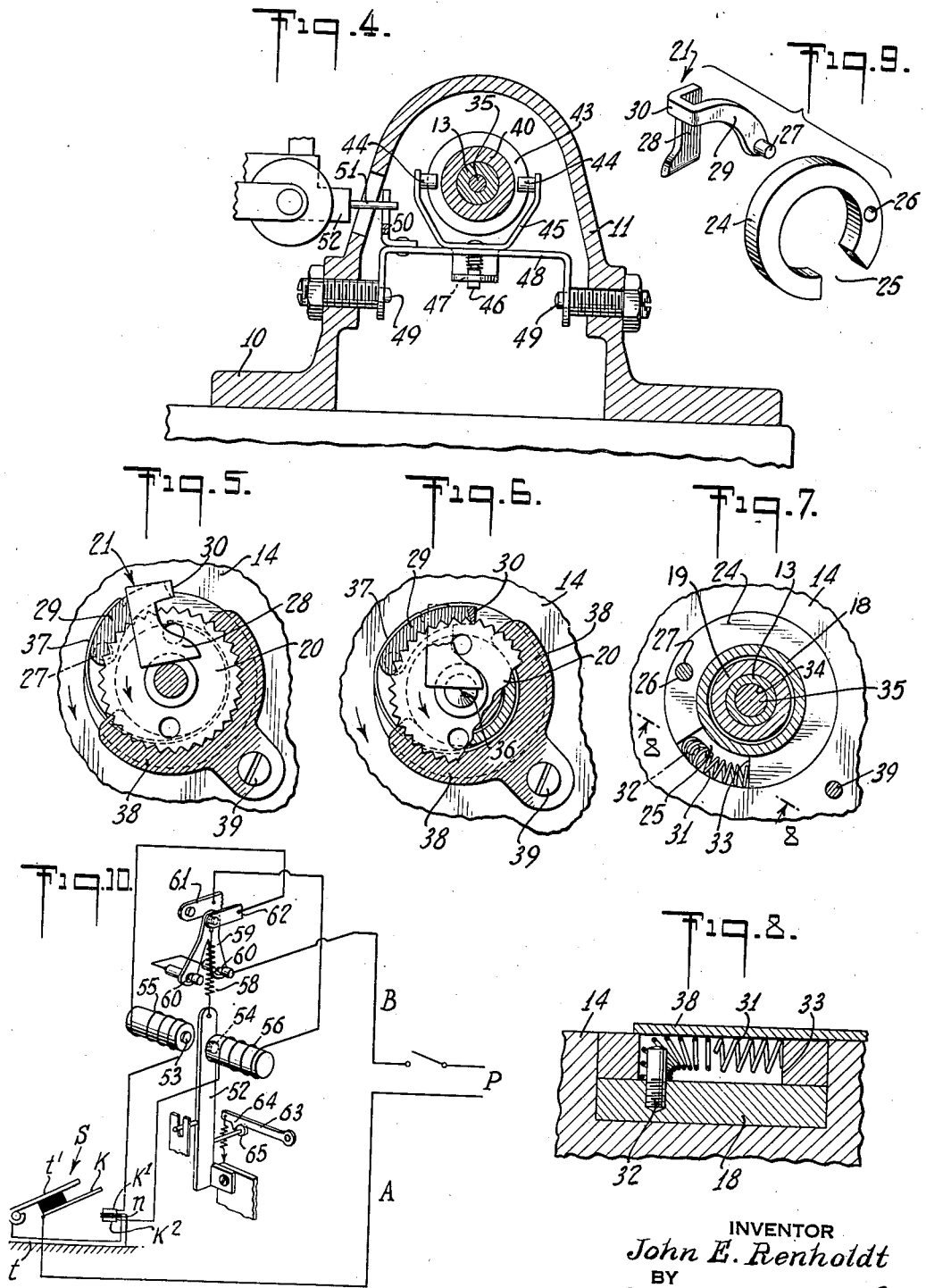

Patented Aug. 10, 1943

2,326,678

UNITED STATES PATENT OFFICE 2,326,678

CLUTCH

John E. Renholdt, Bridgeport, Conn., assignor to Dictaphone Corporation, New York, N. Y., a corporation of New York Application September 4, 1941, Serial No. 409,525

4 Claims. (Cl. 192—23)

This invention relates to clutches, particularly of the type used to drive the record support shafts of commercial phonographs such as dictating machines, and is especially designed for use in connection with electromagnetic operation.

Heretofore it has been the custom to provide such machines with a clutch composed of two members one of which is moved axially into engagement with the other, the said members being provided with rigid engaging elements or teeth. In these machines the driven member which is to be clutched with the constantly rotating driving member, is operatively connected to a mandrel carrying the record tablet and to a feed screw for propelling a carriage, on which is mounted the sound translation devices. These driven elements together possess considerable inertia. With the rigid contact type of clutch, the tips of the rigid projections or teeth frequently "top," that is, make contact tip to tip, thus preventing the clutch members from coming into complete clutching engagement, the result being that the record tablet and carriage receive one or more sharp impacts or false starts. Such futile contact of the clutch members is greatly aggravated where magnetic clutch operation is employed, for, as the electric impulses exciting the magnet at each actuation of the manual control are preferably of brief duration, if the clutch parts are not permitted fully to engage as they come together, the instant impulse is lost and ineffective clutch operation results.

The objects of my invention are to provide a new and improved clutch which may be used effectively with any operating means, which when used with electromagnetic operating means will avoid the difficulty mentioned, and which may be thrown into positive operative engagement without slipping.

A further object is to provide the clutch connection with improved means for cushioning the positive engagement of the clutch elements to prevent the tendency for a recording stylus to first dig into the wax of the record blank and then hop out again thus setting up a period of undesirable up-and-down mechanical movement of the stylus before it finally settles down to cutting a sound groove solely affected by sound vibration.

Other objects will be in part obvious and in part pointed out hereinafter.

The invention accordingly consists in the features of construction, combinations of elements and arrangement of parts as will be exemplified in the structure to be hereinafter described, and the scope of the application of which will be indicated in the following claims.

In the accompanying drawings, in which is shown one of various possible embodiments of the mechanical features of this invention, Fig. 1 is a longitudinal sectional view of the left-hand portion of a well known type of dictating machine, taken on line 1—1 of Fig. 2, showing the driving means, the driven means, a clutch connection embodying the present invention, and means for operating the clutch;

Fig. 2 is a left end elevation of a portion of the machine shown in Fig. 1;

Fig. 3 is a larger detail section of the clutch mechanism, also taken substantially on line 1—1 of Fig. 2;

Fig. 4 is a transverse section of the machine taken on line 4—4 of Fig. 1, showing the clutch operating yoke with electromagnetic means for effecting clutch operation connected therewith;

Fig. 5 is a detail left elevation of the clutch and associated members enlarged to same scale as Fig. 3, showing the clutch in inoperative driving condition;

Fig. 6 is a similar view with parts broken away and showing the clutch operative;

Fig. 7 is a section at 7—7, Fig. 3, showing the clutch drive shoe and cushioning spring;

Fig. 8 is a further enlarged detail section at 8—8 of Fig. 7;

Fig. 9 is an exploded perspective view of the clutch pawl and drive shoe; and

Fig. 10 is a diagrammatic showing of a known type of electromagnetic clutch operating mechanism and its remote control connections.

Similar reference characters refer to similar parts throughout the various views of the drawings.

Referring to the drawings, a dictating machine of well known type is shown comprising a base 10 provided with a housing 11 having at one side a bearing 12 for supporting the driven shaft 13 which supports the record tablet mandrel, not shown. To the left of the housing 11 there is provided a driving pulley 14 engaged by a belt 15 extending to the pulley of a motor, not shown, which furnishes the power to rotate the shaft 13. This pulley has a cast-in hub 16 and is rigidly mounted by means of a hollow oiling stud 17 upon the pulley bushing 18, rotatably mounted upon a sleeve 19, carried at the end of the driven shaft 13. Sleeve 19 is screw-threaded upon the end of the shaft 13 and carries rigidly at its outer left end a suitable peripherally toothed ratchetlike clutch member 20 adapted to cooperate with a pawl clutch member 21 mounted upon the pulley 14 and always rotatable with said pulley. The inner or right-hand surface of the toothed member 20 rotatably engages the left end of the pulley bushing 18, the other end of the pulley bushing being rotatable in respect to a suitable washer 66 interposed between the substantially flush inner end surfaces of said bushing 18 and sleeve 19 and a pinion 67, which is fixed upon the mandrel shaft 13 to drive a feed screw (not shown). A second washer 68 is mounted on the mandrel shaft between the said pinion and the bearing 12.

The bushing 18 is also provided with an annular flange 22 seated in a counterbored portion 23 of the pulley hub. Also seated in said counterbored portion of the hub and mounted for rotative movement about the bushing 18, is a drive shoe 24 in the form of a circumferentially incomplete or segmental annular ring having, as indicated at 25 in Fig. 9, a segmental gap between its opposing ends. Pivotally mounted in a perforation 26 formed in the drive shoe is the drive pawl 21, the form of which will be readily understood by reference to Fig. 9. This pawl is provided with a pin 27 interfitting with the perforation 26, and is shaped to provide two legs 28 and 29 adapted to straddle the toothed member 20, and a connecting portion 30 which at its lower edge is tapered to provide a tooth engageable with the teeth of the toothed member 20. Controlled pivotal movement of the pawl effects engagement with or disengagement from the tooth portion 20 of the shaft sleeve 19.

When the pawl is rocked downwardly to the position shown in Fig. 6, its single tooth portion 30 firmly engages one of the teeth of the member 20 and accordingly provides a positive driving connection between the pulley and the driven shaft. The drive shoe is permitted only limited rotation relative to the pulley by reason of the fact that a helical cushioning spring 31 (see Figs. 7 and 8) occupies the space 25 between the opposing ends of the drive shoe with one end of the spring in contact, as at 33, with one of said opposing drive-shoe ends and with the other end of the spring seated upon a pin 32 which extends laterally from the flange of the bushing 18 into the said space between the drive-shoe ends. The operation of this cushioning device will be referred to later.

The foot of the outer leg 28 of the pawl 21, when the pawl occupies its operative position as in Fig. 6, lies part way across the end of the driven shaft 13 and in the path of projection of a clutch rod 35 mounted to reciprocate coaxially within the bore 34 of the shaft 13. When this rod is projected by suitable operating mechanism outwardly beyond the toothed member 20, its tapered end 36 is adapted to engage the foot of the pawl leg 28 in such a way as to lift the pawl out of engagement with the toothed member (see Fig. 5) and thus render the clutch inoperative. Retraction of the rod 35 so as to withdraw it from contact with the pawl 21, permits the pawl 21 to be forced into operative engagement with the teeth of the member 20, as shown in Fig. 6. The pawl is at all times forced toward the shaft axis by means of a spiral spring element 37 which is suitably attached to the pawl portion 29 and partly surrounds and embraces the portion of the bushing 18 which lies beyond the outer face of the pulley 14.

The cushioning spring 31 is held in the pocket formed between the ends of the drive shoe by means of a cover plate 38 which overlies the drive shoe and is secured to the outer face of the pulley 14, as by means of a screw 39.

In order to shift the clutch rod 35 for the purpose of connecting or disconnecting the pulley with respect to the driven shaft 13, a collar 40 is slidably mounted on the shaft 13, a pin 41 passing diametrically therethrough and through the rod 35 serving to secure these two members together for longitudinal movement relatively to the shaft 13. The shaft 13 is slotted, as at 42, to permit this relative endwise movement. A groove 43 in the collar 40 is adapted to be engaged by pins 44, carried by a yoke 45 forming part of the clutch shifting mechanism. Yoke 45 is secured to a pin 46 passing freely through an aperture 47 in a clutch operating bail 48, fulcrumed on studs 49 mounted in the machine housing 11. Extending upwardly from the bail is a bifurcated member 50 cooperative with a pin 51 projecting outwardly from the armature 52 of a suitable electromagnet having opposing magnetic poles 53 and 54 (see Fig. 10), disposed upon opposite sides of the armature. The armature is mounted to rock in the space between these poles and is attracted to one or the other according as the appropriate magnet coil 55 or 56 is energized by operation of the control switch S. The armature is designed to snap from one extreme position to the other as it passes center, this being accomplished by means of an overthrow spring 58 connecting the armature with a lever member 59 which is mounted to rock about fulcrum points 60 alternatively into and out of contact with two electrical contact members 61 and 62.

This magnetic clutch control unit is wired as follows: From any suitable source, as at P, one side A of the line extends to the middle point or movable contact k of the snap switch S. This contact is adapted to be moved alternatively into contact with switch contacts k1 and k2. Switch contact k1 is connected to the magnet coil 55 and then to the contact member 62. Switch contact k2 is connected to the coil 56 and then to the contact member 61. The other side B of the power line extends to the pivots supporting the toggle lever 59. Thus, with the parts in the position shown in Fig. 10, the operating mechanism is set to energize coil 55 of the magnet when contact is made between switch parts k and k1. When this occurs the armature is drawn toward the pole 53 and, after it has passed center, snaps into contact therewith. As this occurs the toggle lever 59 throws over into contact with 61, thus breaking the circuit through coil 55 and preparing a circuit through coil 56 which will become operative when energized by contact between switch parts k and k2. The armature is held in either of its limit positions by means of a spring biased lever 63 having a detent 64 ridable over a cam member 65 carried by the armature 52.

The electromagnetic control unit, as described above, is preferably energized by a switch that only closes the circuit momentarily, it being unnecessary to maintain the electromagnet energized for the purpose of keeping the clutch mechanism in either its clutched or unclutched condition. The snap switch S mentioned above is of this type.

In Fig. 10, the snap switch S, which is shown diagrammatically as being of the said preferred type, comprises the leaf spring contact k, and the two fixed contacts $k1$ and $k2$, arranged at opposite sides of a piece of insulating material $n$. When the spring $k$ is pressed down it is bent to such an extent by successive contact with $k1$ and $n$ that when it clears $n$ it will snap past contact $k2$ without touching it. Similarly, when the spring $k$ is moved upwardly from its lower position it will make contact with $k2$ and the insulation $n$ but will avoid contact with $k1$. Parts $k1$, $k2$ and $n$ may be rigidly mounted on the base plate $t$ of the switch S. The spring $k$ is connected, as mentioned above, to the power line A, contact $k1$ to magnet coil 55 and contact $k2$ to magnet coil 56. The switch spring $k$ is attached to a movable plate $t1$ that is restored to normal position when it is released by a spring (not shown). The switch S may be designed for either hand or foot operation and be situated at any convenient point with reference to the dictating machine.

The purpose of the cushioning spring 31 is efficiently and simply to overcome faulty recording resulting momentarily whenever the record mandrel is started by means of a positive clutch. When the mandrel is started instantaneously there is a tendency for the recording stylus first to dig into the wax of the record blank and then alternately leave the wax and dig in again until such time as the said stylus finally settles down to steady operation. Thus each time the record blank is started rotating by engagement of the clutch, a noisy recording is made. It has been found that if the mandrel is made to gain momentum more slowly this effect is avoided. With the present drive connection the clutch pawl is mounted on the drive shoe which is movably mounted relatively to the drive pulley. In operation, as soon as the clutch pawl engages the toothed clutch member the drive shoe is moved around in its seat on the pulley against the reaction of the coil spring until the accelerating force is equalled by the back pressure of the spring. Then the spring and drive shoe recover their normal positions as the mandrel comes up to full speed and recording takes place smoothly and without noise effects.

From the foregoing it will be apparent that this invention is one well adapted to attain the objects hereinbefore set forth, in a simple and efficient manner.

As many possible embodiments may be made of the above invention without departing from the scope thereof, it is to be understood that all matter herein set forth or shown in the accompanying drawings is to be interpreted as illustrative and not in a limiting sense.

I claim:

1. In a device of the character set forth, in combination, a driven shaft, a drive pulley relatively rotatable upon said shaft having an annular groove encircling said shaft, a clutch element rigid with said shaft, a drive shoe movable circumferentially in said annular groove, a clutch element carried by said drive shoe and movable into and out of driving engagement with said clutch element on said shaft, and a spring operatively disposed between said drive shoe and said drive pulley to take up shock when said clutch elements move into driving engagement.

2. In a device of the character set forth, in combination, a driven shaft, a drive pulley relatively rotatable upon said shaft having an annular groove encircling said shaft, a clutch element rigid with said shaft, a segmental annular drive shoe movable circumferentially in said annular groove, means positioned in said groove between the ends of said segmental drive shoe for limiting such circumferential movement, resilient means interposed between an end of said drive shoe and said limiting means, and a clutch element carried by said drive shoe and movable into and out of driving engagement with said clutch element on said shaft.

3. In a device of the character set forth, in combination, a first rotatably mounted clutch member, a second clutch member mounted to rotate about said first member in coaxial relationship therewith, a ratchet wheel rigidly mounted upon said first clutch member beyond a face of said second clutch member normal to the clutch axis, a spring pressed pawl pivotally mounted upon said second clutch member adapted normally to make driving contact with said ratchet wheel, a rod shiftable coaxially within said first clutch member to engage an extended portion of and trip said pawl out of driving contact with said ratchet wheel, and means for shifting said rod.

4. In a device of the character set forth, in combination, a constantly rotatable first clutch member, a second clutch member mounted to rotate about said first member in coaxial relationship therewith, a ratchet wheel rigidly carried by one of said members, a spring pressed pawl rotatable with the other of said members in a circular path coaxial with said ratchet wheel and mounted for movement into and out of cooperative contact with said ratchet wheel, a spring normally holding said pawl in engagement with said ratchet wheel, and control means comprising a rod shiftable axially within said first clutch member operable to engage a portion of said pawl and hold said pawl out of engagement with said ratchet wheel in opposition to the action of said spring.

JOHN E. RENHOLDT.